United States Patent [19]

Domahidy

[11] 4,402,713
[45] Sep. 6, 1983

[54] PROCESS FOR REMOVING HYDROGEN SULFIDE FROM FLUIDS

[75] Inventor: George Domahidy, Englewood, Colo.

[73] Assignee: Stone & Webster Engineering Corp., Boston, Mass.

[21] Appl. No.: 267,501

[22] Filed: May 27, 1981

[51] Int. Cl.³ .......................................... B01D 19/00
[52] U.S. Cl. .................................. 55/53; 60/641.2; 210/750
[58] Field of Search ............... 423/220, 234, 238, 420, 423/563; 210/170, 750; 60/641.2; 55/53

[56] References Cited

U.S. PATENT DOCUMENTS

| | | | |
|---|---|---|---|
| 1,851,987 | 4/1932 | Schwab et al. | 210/750 |
| 1,964,487 | 6/1934 | Smith | 210/750 |
| 4,259,300 | 3/1981 | Lieffers | 423/238 X |
| 4,297,330 | 10/1981 | Schlauer et al. | 423/232 |

OTHER PUBLICATIONS

Beychok, "Aqueous Wastes from Petroleum and Petrochemical Plants", pp. 175-181.
Allen et al., "Abatement of Hydrogen Sulfide Emissions from the Geyers Geothermal Power Plant", Second United Nations Symposium on the Development and Utilization of Geothermal Resources, 1975, pp. 1313-1315.

Primary Examiner—Earl C. Thomas
Attorney, Agent, or Firm—Hedman, Casella, Gibson, Costigan & Hoare

[57] ABSTRACT

A process is disclosed for removing hydrogen sulfide from fluid, particularly geothermal steam. Condensate rich in hydrogen sulfide is passed countercurrently with vapor rich in carbon dioxide to strip the condensate of hydrogen sulfide.

5 Claims, 3 Drawing Figures

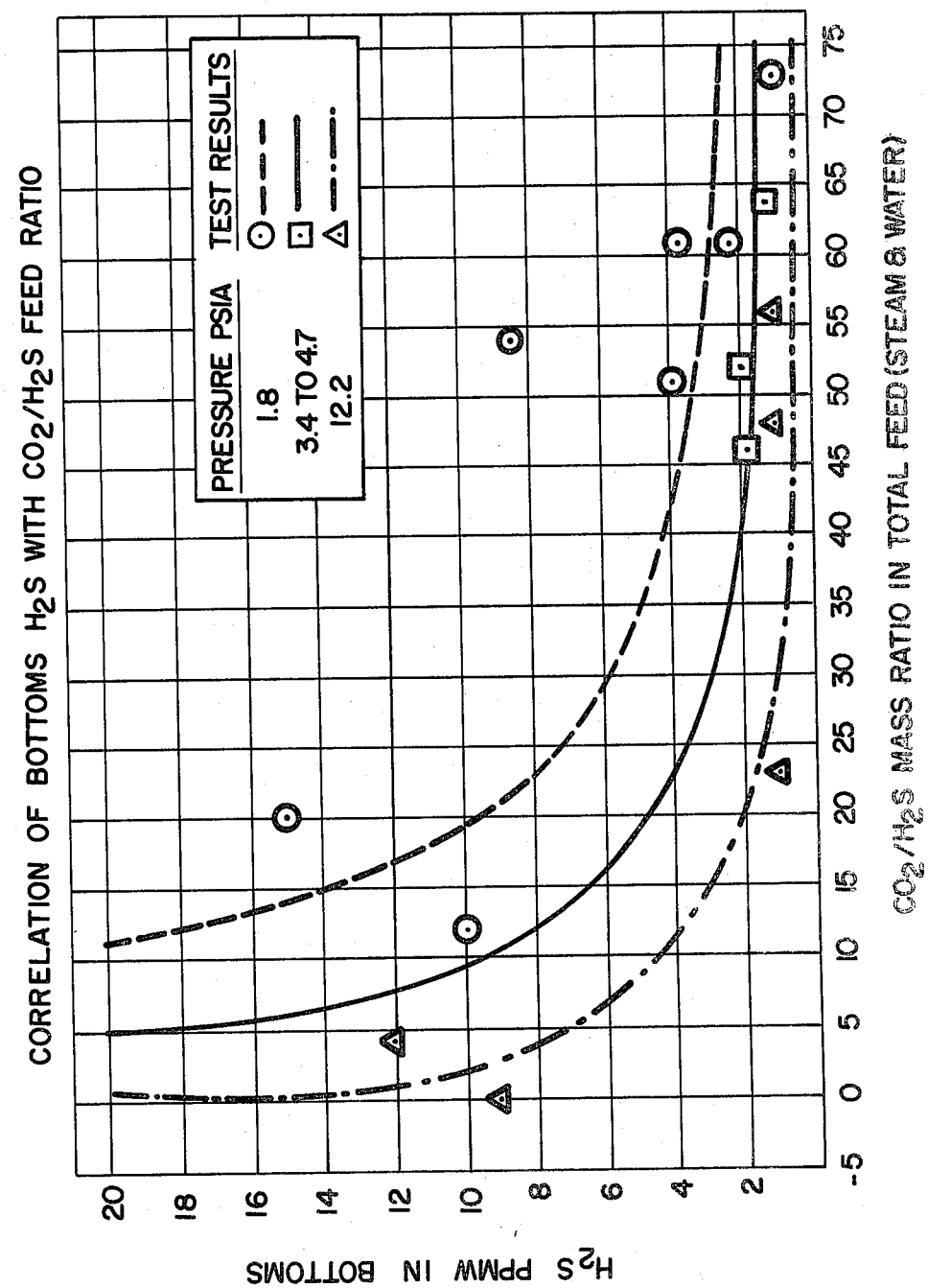

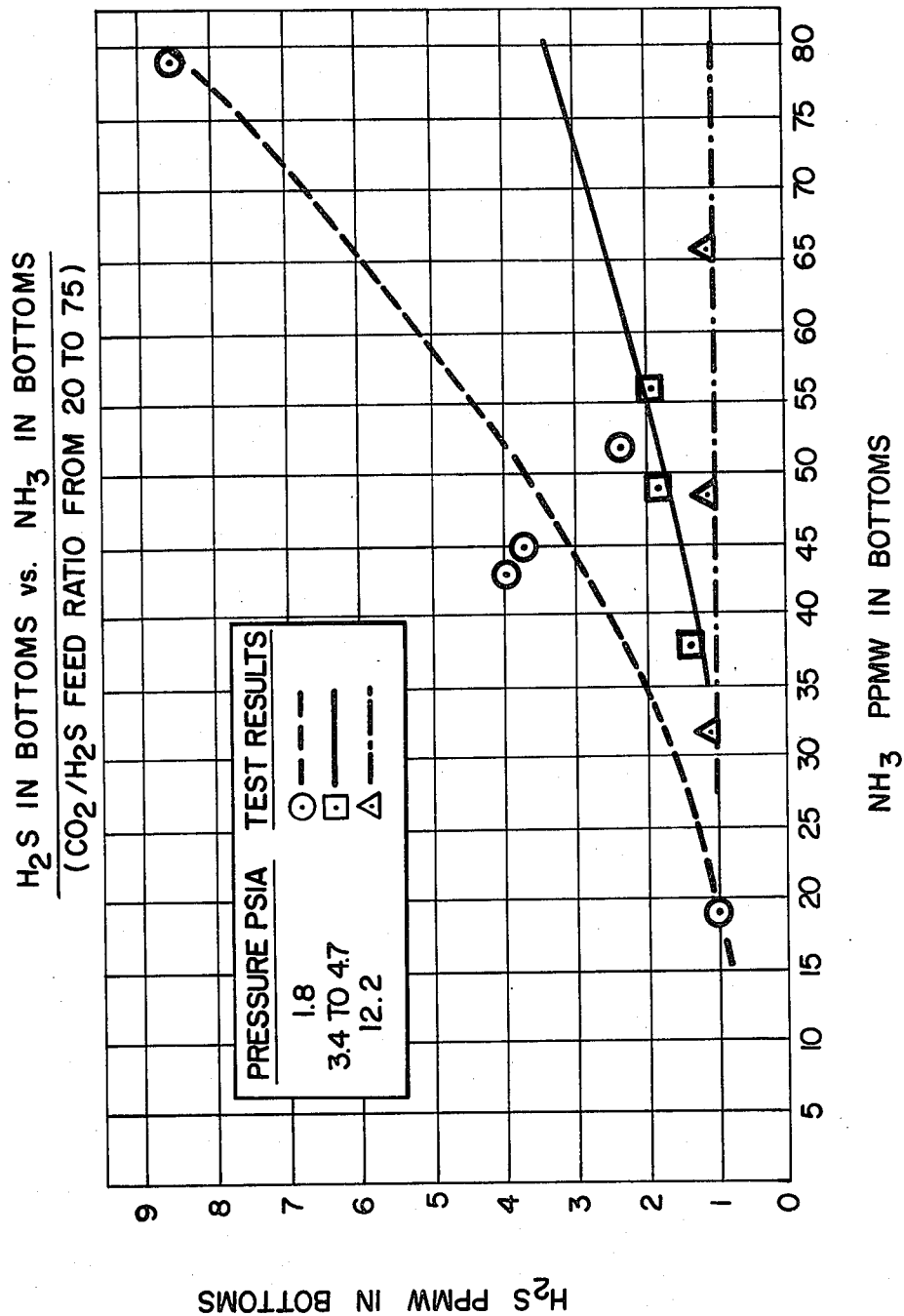

PROCESS FOR REMOVING HYDROGEN SULFIDE FROM FLUIDS

FIELD OF THE INVENTION

This invention relates to a process and system for removing hydrogen sulfide from a fluid. More specifically, the invention relates to a process and system for removing hydrogen sulfide from geothermal steam. Most specifically, the process relates to a process for removing hydrogen sulfide from a fluid by stripping the fluid with a carbon dioxide ($CO_2$) rich stream.

DESCRIPTION OF THE PRIOR ACT

Hydrogen sulfide is a pollutant that should not be discharged into the environment. As a result several states are investigating the merits of specifying the hydrogen sulfide level or content that effluent entering the environment can contain. For example, it is expected that Sonoma County, California will establish a standard requiring that the hydrogen sulfide content in any stream being discharged into the environment be below five (5) parts per million parts of water (ppmw).

One source of hydrogen sulfide is geothermal steam. Geothermal steam is high pressure steam from a natural source. Typically, geothermal steam contains entrained compounds, one of which is hydrogen sulfide. Notwithstanding, geothermal steam is a very desirable source of energy that can be used for many purposes. One purpose is to drive the turbine generators of electrical power producing plants. In practice, untreated geothermal steam is delivered to the turbine of the turbine generator to provide the motive force for rotating the turbine shaft. As in all typical steam turbine installations, the discharge must either be rejected to the envioronment or recycled.

The spent geothermal steam that is discharged from a steam turbine becomes high in hydrogen sulfide content by virtue of accumulation in the condensate of the turbine generator condenser. In practice, it has been found that a significant portion of the hydrogen sulfide originally contained in the geothermal steam will be entrained in the condenser condensate rather than passing overhead in the uncondensed vapor discharged from the condenser. As a result, recycle of the condensate to the geothermal steam source will continually increase the hydrogen sulfide in the system or the geothermal source. Either result is undesirable and unacceptable.

The problem of hydrogen sulfide removal has received attention. The current procedure for removing hydrogen sulfide from geothermal steam is by hydrogen peroxide oxidation of hydrogen sulfide in the condensate. The cost of hydrogen peroxide is considerable and the oxidation of hydrogen sulfide by hydrogen peroxide is a cost that the process of this invention reduces by a significant amount.

It is also believed that the use of stripping processes to effect hydrogen sulfide removal has been investigated. The previous stripping processes considered for hydrogen sulfide removal have been directed to steam stripping and flue gas stripping. The steam stripping processes have employed pure steam as distinct from steam rich in carbon dioxide. The process employing flue gas is directed to stripping hydrogen sulfide from sour water. The specific flue gas stripping process is disclosed in *Aqueous Wastes From Petroleum and Petrochemical Plants* by Milton R. Beychok. Therein, the flue gas used for stripping contains three to six (3-6) percent oxygen, eight to twelve (8-12) percent carbon dioxide with the balance being nitrogen.

SUMMARY OF THE INVENTION

It is an object of the invention to provide a process and system for removing hydrogen sulfide from fluid.

It is another, more specific, object of the invention to provide a process and system for removing hydrogen sulfide from geothermal steam.

It is a further object of the invention to provide a process and system for removing hydrogen sulfide from geothermal steam by utilizing carbon dioxide ($CO_2$) found naturally in the geothermal steam.

The process of the invention includes the delivery of condensate rich in hydrogen sulfide to the top of a stripping tower, delivery of a steam rich in carbon dioxide to the bottom of the stripping tower and passage of the carbon dioxide rich steam countercurrently with the hydrogen sulfide rich condensate. The result is that the hydrogen sulfide is stripped from the hydrogen sulfide rich condensate and captured in the carbon dioxide steam stream. The steam containing the carbon dioxide and hydrogen sulfide is delivered to downstream processing equipment, such as a Stretford Process, to separate the hydrogen sulfide and, optionally, remove elemental sulfur.

In certain specific instances of the process, geothermal steam is passed through the steam ejectors used to evacuate the gas and air from the turbine generator system condenser and the composite stream of geothermal steam and vapor from the condenser is used as the stripping steam in the stripper.

BRIEF DESCRIPTION OF THE DRAWING

The drawings show the process and system of the invention and the results obtained by the invention.

FIG. 2 is a graph plotting the results of tests practicing the process of the invention as a function of $CO_2/H_2S$.

FIG. 3 is a graph plotting the results of the invention as a function of ammonia in the condensate.

DESCRIPTION OF THE PREFERRED EMBODIMENT

Figure 1:
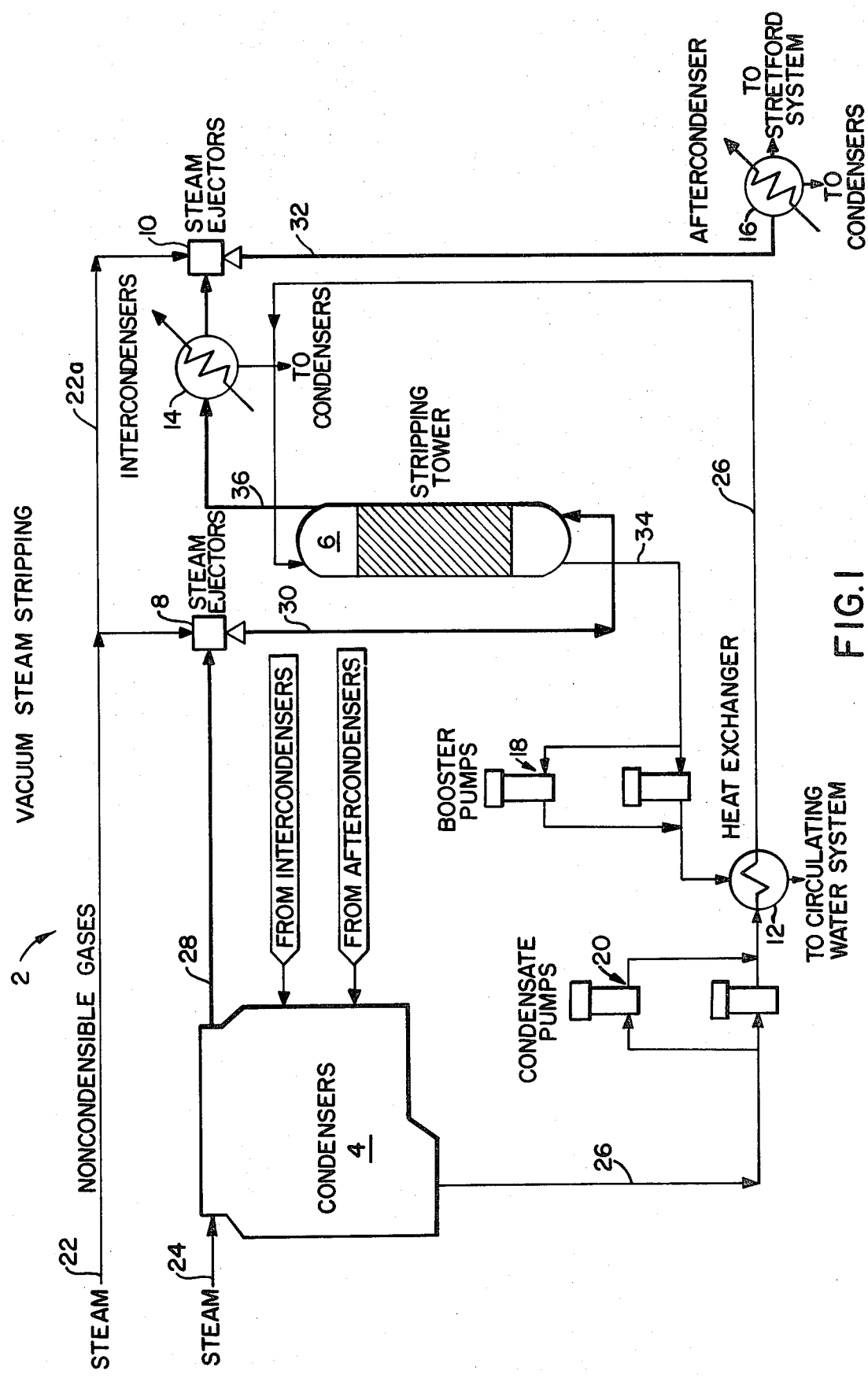
FIG. 1 is a schematic diagram of the process and system of the invention.

The process and system of the invention is directed to the removal of hydrogen sulfide from fluid.

As best seen in FIG. 1, the overall hydrogen removal system 2 is shown with the principle components of the system.

The system 2 is comprised essentially of a stripping tower 6, steam ejectors 8 and 10, connecting lines and ancillary equipment. The ancillary equipment includes heat exchangers 12, 14 and 16, booster pumps 18 and condensate pumps 20.

The system lines include steam lines 22, 22a and 24, condensate line 26, condenser overhead or vapor line 28, ejector discharge lines 30, 32, stripper bottoms line 34 and stripper overhead line 36.

In operation, the discharge from the steam turbine of a turbine-generator is delivered through line 24 to the turbine-generator condenser 4. Steam is also delivered through line 22 to steam ejectors 8 that are used to keep the condenser 4 at or near the vacuum conditions desirable for efficient steam turbine cycle operations. The steam delivered through line 22 may be geothermal steam.

The steam in line 24 from the turbine is spent geothermal steam containing, among other components, carbon dioxide and hydrogen sulfide. A considerable portion of the hydrogen sulfide from the spent geothermal steam is dissolved in the condensate, while the remainder of the hydrogen sulfide remains in the condenser vapor. Typically about fifty (50) percent of the hydrogen sulfide from the geothermal steam is dissolved in the condensate. Conversely, most of the carbon dioxide from the spent geothermal steam remains in the condenser vapor.

Condensate forms in the condenser 4 from the spent geothermal steam and is removed through line 26 and is pumped by condensate pumps 20 to the stripping tower 6 where the condensate enters at the top of the stripping tower 6.

Vapor from the condenser 4 is ejected through line 28 and is entrained with the steam from line 22. The vapor is rich in carbon dioxide. The composite stream of steam from line 22 and the carbon dioxide rich vapor from line 28 is delivered through line 30 to the stripping tower 6. The steam vapor from line 30 passes countercurrently with the hydrogen sulfide rich condensate entering the stripping tower 6 through line 26 to remove the hydrogen sulfide from the condensate.

The stripping gas containing the hydrogen sulfide is withdrawn from the stripping tower 6 through line 36 by steam ejectors 10. The steam ejectors may be operated by geothermal steam from line 22a. The discharge from the steam ejectors 10 contains both steam from line 22a and the hydrogen sulfide rich overhead from the stripping tower 6. Line 32 is used to transport the hydrogen sulfide rich overhead from the stripping tower and the steam from line 22a to a conventional Stretford System wherein the hydrogen sulfide is converted to elemental sulfur and other products.

The bottoms from the stripping tower 6 is essentially free of hydrogen sulfide and can be pumped by booster pumps 18 through line 34 to the circulating water system.

The heat exchangers 12, 14 and 16 are optionally located in the system 2 to recover heat where applicable.

The process has been tested in pilot plant facilities. The process was tested at low, intermediate and atmospheric pressures. The results of the tests are shown in FIG. 2 wherein the $CO_2/H_2S$ ratio is plotted against the $H_2S$ content in the stripper bottoms.

The results indicate that the process is neither temperature nor pressure dependant but that the carbon dioxide to hydrogen sulfide ratio in the feed is a significant factor in the performance of the process. It was noted that the carbon dioxide to hydrogen sulfide ratio should be higher at the lower pressures. Further, as seen in FIG. 2, the $CO_2/H_2S$ ratio at atmospheric pressure should be about 10 to obtain the 5 ppmw of $H_2S$ in bottoms effluent. At pressure of 1.8 psia the ratio of $CO_2/H_2S$ should be increased to 35 to obtain the same 5 ppmw of $H_2S$ in the bottoms.

The pilot plant tests simulated actual conditions and provide a means by which the composition of the steam feed could be varied. The process condition and the results of fifteen test runs are as follows:

TABLE I

| | | Program Test Number | 1 | 2 | 3 | 4 | 6 | 7 | 8 | 9 | 10 | 11 | 12 | 13 | 14 | 15 |
|---|---|---|---|---|---|---|---|---|---|---|---|---|---|---|---|---|
| | | Test Date | 3/5/81 | 3/6/81 | 3/6/81 | 3/6/81 | 3/6/81 | 3/6/81 | 3/6/81 | 3/6/81 | 2/26/81 | 2/26/81 | 3/25/81 | 3/25/81 | 3/25/81 | 3/25/81 |
| | | Test Start Time | 19:37 | 20:18 | 19:45 | 22:25 | 18:35 | 17:32 | 16:33 | 14:45 | 17:00 | 18:00 | 16:23 | 17:37 | 18:35 | 20:28 |
| STEAM FEED (line 30) | | Column Bottom Pressure PSIA | 1.75 | 3.35 | 4.67 | 3.41 | 1.75 | 1.81 | 1.87 | 1.77 | 1.74 | 1.74 | 12.27 | 12.25 | 12.19 | 12.18 |
| | | Flowrate LB/HR total | 37 | 36 | 36 | 81 | 37 | 37 | 35 | 38 | 36 | 36 | 43 | 43 | 41 | 41 |
| | | Temperature °F. | 192 | 189 | 202 | 178 | 201 | 182 | 185 | 186 | 189 | 189 | 220 | 220 | 220 | 220 |
| | | Superheat °F. | 72 | 44 | 44 | 32 | 82 | 57 | 61 | 65 | 70 | 71 | 17 | 17 | 15 | 15 |
| Hydrogen Sulfide | | Flowmeter Reading PPMW H₂S | 960 | 1160 | 1160 | 1020 | 1120 | 1120 | 1190 | 4240 | 1080 | 1080 | 970 | 970 | 3980 | 400 |
| | | Flowmeter Reading LB/HR H₂S | 0.0357 | 0.0416 | 0.0416 | 0.0830 | 0.0416 | 0.0416 | 0.0416 | 0.161 | 0.0389 | 0.0389 | 0.0416 | 0.0416 | 0.160 | 0.0163 |
| | | Wet Chemical Analysis PPMW H₂S | — | — | — | 850 | — | 1680 | 1280 | 6300 | — | — | 1260 | — | 5040 | 530 |
| | | Wet Chemical Analysis LB/HR H₂S | — | — | — | 0.069 | — | 0.062 | 0.045 | 0.239 | — | — | 0.054 | — | 0.207 | 0.022 |
| Ammonia | | Flowmeter Reading PPMW NH₃ | 0 | 0 | 0 | 0 | 0 | 0 | 0 | 0 | 0 | 0 | 0 | 0 | 0 | 0 |
| | | Flowmeter Reading LB/HR NH₃ | 0 | 0 | 0 | 0 | 0 | 0 | 0 | 0 | 0 | 0 | 0 | 0 | 0 | 0 |
| Carbon Dioxide | | Flowmeter Reading PPMW CO₂ | 86,800 | 96,400 | 96,400 | 85,800 | 93,800 | 93,800 | 20,000 | 102,000 | 89,200 | 89,200 | 80,700 | 80,700 | 16,500 | 18,400 |
| | | Flowmeter Reading LB/HR CO₂ | 3.21 | 3.47 | 3.47 | 7.03 | 3.47 | 3.47 | 0.700 | 3.88 | 3.21 | 3.21 | 3.47 | 3.47 | 0.678 | 0.755 |
| | | CC Analysis PPMW CO₂ | 86,800 | 96,400 | 96,400 | 86,800 | 93,000 | 93,000 | 63,800 | 102,000 | — | — | 80,700 | — | 16,300 | 18,800 |
| | | CC Analysis LB/HR Total | 3.2 | 3.5 | 3.5 | 7.0 | 3.4 | 3.4 | 2.2 | 3.9 | — | — | 3.5 | — | 0.67 | 0.77 |
| WATER FEED (line 26) | | Flowrate LB/HR Total | 985 | 946 | 929 | 945 | 986 | 961 | 954 | 978 | 445 | 410 | 480 | 410 | 385 | 370 |
| | | Temperature °F. | 118 | 146 | 160 | 147 | 108 | 139 | 134 | 118 | 118 | 118 | 203 | 175 | 174 | 169 |
| | | pH | 9.1 | 9.3 | 9.3 | 9.3 | 9.2 | 9.2 | 9.2 | 9.2 | 9.2 | 9.2 | 8.9 | 8.9 | 9.0 | 9.0 |
| Hydrogen Sulfide | | ISE Analysis PPMW H₂S | 17 | 28 | 37 | 27 | 23 | 28 | 18 | 32 | 11 | 34 | 60 | 47 | 43 | 45 |
| | | ISE Analysis LB/HR H₂S | 0.017 | 0.026 | 0.034 | 0.026 | 0.023 | 0.027 | 0.017 | 0.031 | 0.0049 | 0.014 | 0.029 | 0.019 | 0.016 | 0.017 |
| Ammonia | | ISE Analysis PPMW NH₃ | 63 | 73 | 61-73 | 63 | 63 | 66 | 75 | 66 | 32 | 81 | 115 | 89 | 73 | 71 |
| | | ISE Analysis LB/HR NH₃ | 0.062 | 0.069 | 0.062 | 0.060 | 0.062 | 0.063 | 0.072 | 0.065 | 0.014 | 0.033 | 0.055 | 0.036 | 0.028 | 0.026 |
| Carbon Dioxide | | TIC Analysis PPMW CO₂ | 26 | 18 | 18 | 18 | 18 | 18 | 18 | 18 | — | — | 5.5 | 7.3 | 7.3 | 7.3 |
| | | TIC Analysis LB/HR CO₂ | 0.026 | 0.017 | 0.017 | 0.017 | 0.017 | 0.017 | 0.017 | 0.017 | — | — | 0.0026 | 0.0030 | 0.0028 | 0.0027 |

| | | Program Test Number | 1 | 2 | 3 | 4 | 6 | 7 | 8 | 9 | 10 | 11 | 12 | 13 | 14 | 15 |
|---|---|---|---|---|---|---|---|---|---|---|---|---|---|---|---|---|
| BOTTOMS (line 34) | | Flowrate by Mass Balance LB/HR Total | 986 | 955 | 929 | 946 | 1005 | 954 | 948 | 985 | 445 | 413 | 491 | 428 | 407 | 397 |
| | | Flowrate, Measured LB/HR Total | — | — | — | — | — | — | — | — | — | — | 540 | 440 | 422 | 402 |
| | | Temperature °F. | 120 | 145 | 158 | 146 | 119 | 125 | 124 | 121 | 119 | 120 | 203 | 203 | 205 | 205 |
| | | pH | 9.1 | 8.6 | 8.4 | 8.5 | 8.9 | 8.8 | 9.1 | 8.7 | 8.5 | 8.5 | 8.1 | 8.1 | 8.6 | 8.6 |
| Hydrogen Sulfide | | ISE Analysis PPMW H₂S | 3.7 | 1.9 | 1.8 | 0.85-1.7 | 8.5 | 3.9 | 10 | 15 | <1 | 2.3 | <1 | <1 | 12 | <1 |
| | | ISE Analysis LB/HR H₂S With CO₂ Deleted from Steam Feed, PPMW | 0.00365 | 0.00181 | 0.00167 | 0.00121 | 0.00854 | 0.00372 | 0.00948 | 0.0148 | 0.000445 | 0.000949 | 0.000491 | 0.000428 | 0.000488 | 0.000397 |
| Ammonia | | ISE Analysis PPMW NH₃ | 45 | 56 | 49 | 38 | 79 | 43 | 30 | 58 | 19 | 52 | 66 | 49 | 38 | 9.1 |
| | | ISE Analysis LB/HR NH₃ | 0.0444 | 0.0535 | 0.0455 | 0.0360 | 0.0794 | 0.0410 | 0.0284 | 0.0571 | 0.00846 | 0.0215 | 0.0324 | 0.0210 | 0.0155 | 0.0127 |
| Carbon Dioxide | | TIC Analysis PPMW CO₂ | 73 | 110 | 120 | 99 | 84 | 81 | 33 | 77 | — | — | 120 | 120 | 31 | 37 |
| | | TIC Analysis LB/HR CO₂ | 0.0720 | 0.105 | 0.111 | 0.0940 | 0.0840 | 0.0773 | 0.0313 | 0.0759 | — | — | 0.0589 | 0.0514 | 0.0126 | 0.0147 |
| OVERHEADS (line 36) | | Flowrate LB/HR Total | 36 | 27 | 36 | 80 | 18 | 44 | 41 | 31 | 36 | 33 | 32 | 25 | 19 | 14 |
| | | Temperature °F. | 118 | 144 | 156 | 145 | 117 | 125 | 123 | 119 | 118 | 119 | 202 | 200 | 204 | 204 |
| | | Pressure PSIA | 1.7 | 3.3 | 4.6 | 3.4 | 1.7 | 1.8 | 1.8 | 1.7 | 1.7 | 1.7 | 12.2 | 12.2 | 12.1 | 12.1 |
| Hydrogen Sulfide | | Mass Balance PPMW H₂S | 1360 | 2450 | 2060 | 1350 | 3120 | 1480 | 1200 | 5710 | 1210 | 1570 | 2180 | 2420 | 9020 | 2330 |
| | | Mass Balance LB/HR H₂S | 0.0490 | 0.0662 | 0.0740 | 0.108 | 0.0561 | 0.0649 | 0.0491 | 0.177 | 0.0434 | 0.0520 | 0.0700 | 0.0605 | 0.171 | 0.0326 |
| | | Wet Chemical Analysis PPMW H₂S | — | 4990 | 8820 | 2300 | 6060 | 3240 | 1360 | 10,600 | — | — | 3730 | 5210 | 12,800 | 5160 |
| | | Wet Chemical Analysis LB/HR H₂S | — | 0.13 | 0.30 | 0.18 | 0.11 | 0.14 | 0.056 | 0.33 | — | — | 0.12 | 0.13 | 0.24 | 0.072 |
| Ammonia | | Mass Balance PPMW NH₃ | 500 | 590 | 460 | 300 | 0 | 500 | 1070 | 270 | 160 | 350 | 720 | 640 | 680 | 930 |
| | | Mass Balance LB/HR NH₃ | 0.018 | 0.016 | 0.017 | 0.024 | 0 | 0.022 | 0.044 | 0.0083 | 0.0056 | 0.012 | 0.023 | 0.016 | 0.013 | 0.013 |
| Carbon Dioxide | | Mass Balance PPMW CO₂ | 87,900 | 125,000 | 93,800 | 85,900 | 189,000 | 77,500 | 16,700 | 123,000 | — | — | 107,000 | 137,000 | 35,200 | 53,100 |
| | | Mass Balance LB/HR CO₂ | 3.16 | 3.38 | 3.38 | 6.87 | 3.40 | 3.41 | 0.686 | 3.82 | — | — | 3.41 | 3.42 | 0.668 | 0.743 |
| | | CC Analysis PPMW CO₂ | 78,400 | 96,900 | 79,500 | 89,400 | 350,000 | 77,800 | 24,300 | 126,900 | — | — | — | 196,000 | 32,200 | 51,300 |
| | | CC Analysis LB/HR CO₂ | 2.8 | 2.6 | 2.9 | 7.2 | 6.3 | 3.4 | 1.0 | 3.9 | — | — | — | 4.9 | 0.61 | 0.72 |

The pilot plant facilities included a packed column (simulating the stripping tower 6), water and steam injection and removal systems, and associated instrumentation.

The facility was designed around a 12-in. diameter fiberglass column (stripping tower 6) 12 ft. high, packed with ½-in. ceramic Intalox saddles to a depth of 5 ft. Fiberglass demister pads were installed in the upper section of this column to reduce entrained water in the overheads. A wide-angle spray nozzle above the packing insured uniform distribution of the liquid feed.

A simulated geothermal steam was prepared for this study by injecting $H_2S$, $NH_3$, and $CO_2$ into steam from an on-site boiler. The steam line included a knockout pot to remove entrained water and a superheater to regulate the steam temperature. The injection of $H_2S$, $NH_3$, and $CO_2$ into the steam line was controlled by a gas metering system. An in-line mixer was installed in the steam line downstream of the gas injection ports to insure the homogeneity of the steam feed.

The liquid feed system was designed to produce a range of simulated geothermal condensates. A water feed at the desired temperature was obtained by directly mixing cold tap water and hot boiler water. A concentrated solution of geothermal constituents was injected into the water feed by a small metering pump. An 8 percent solution of ammonium sulfide $(NH_4)_2S$, was injected.

Corrosion resistant materials were used throughout the pilot plant to minimize side reactions with $H_2S$ and $NH_3$. Inlet and outlet liquid lines were stainless steel. The concentrated ammonium sulfide and ammonium bicarbonate solutions were injected through a polyethylene line. Inlet and outlet steam lines were fiberglass; inert plastic or stainless steel was used for sample lines, valves, flowmeters, thermocouples, and other parts and fittings.

Liquid flowrates were measured with rotameters; orifice meters were used to measure steam flowrates. These flowmeters were calibrated in place with either water or steam. The flowrates of $CO_2$, $H_2S$, and $NH_3$ injected into the inlet stream line were measured with calibrated mass flowmeters. Temperatures were measured with thermocouples located in inlet and outlet lines, and were recorded on a multipoint strip chart recorder. Column pressures were measured with a mercury manometer.

Liquid and gas sampling ports were located on the inlet field to give a quantitative analysis of $CO_2$. Water and air were analyzed qualitatively only. Based on laboratory tests it was anticipated that the GC could also be used for the analysis of $H_2S$ in the vapor phase. However, in the field it it proved impossible to obtain reproducible analyses for $H_2S$ presumably due to the presence of air in the steam and water supplies. Field observations support the theory that $H_2S$ was oxidized to elemental sulfur in the sampling lines before entering the GC.

For this reason, a wet chemical method was used to analyze for $H_2S$ in the vapor. The sampling train consisted of two cold bubblers in series followed by a dessicant tube to collect residual water. The $H_2S$ was collected in 2 N NaOH with ascorbic acid added as an antioxidant, and analyzed with the selective ion electrode system described above.

For the sake of consistency, all calculations in later sections were based on smoothed numbers based on component and overall mass balances. These numbers are included in Table 1 under the heading "Mass Balance." The accurancy of these mass balance numbers may be judged by comparison with the measured quantities.

I claim:

1. A process for removing hydrogen sulfide from spent geothermal steam, said spent geothermal steam comprising hydrogen sulfide and carbon dioxide, said process comprising the steps of:
  a. delivering the spent geothermal steam to a condenser;
  b. cooling the spent geothermal steam in the condenser to generate a condensate rich in hydrogen sulfide and a non-condensed vapor rich in carbon dioxide;
  c. delivering the condensate rich in hydrogen sulfide to a stripping tower;
  d. delivering the vapor rich in carbon dioxide to the stripping tower;
  e. passing the condensate rich in hydrogen sulfide concurrently with the vapor rich in carbon dioxide in the stripping tower, such that the vapor rich in carbon dioxide removes the hydrogen sulfide from the condensate; and
  f. removing the resultant carbon dioxide and hydrogen sulfide rich vapor from the stripping tower.

2. A process as in claim 1 further comprising the step of ejecting the vapor rich in carbon dioxide from the condenser by passing geothermal steam through a steam ejector and delivering the vapor and geothermal steam to the stripping tower.

3. A process as in claim 1 or 2 wherein the condensate rich hydrogen sulfide and the vapor rich in carbon dioxide are passed countercurrently in a stripping tower maintained at low pressures in the range of 1.8 psia and the ratio of carbon dioxide to hydrogen sulfide in the stripping tower is at least about 35 to 1.

4. A process as in claims 1 or 2 where the condensate rich in hydrogen sulfide and the vapor rich in carbon dioxide are passed countercurrently in a stripping tower maintained at atmospheric pressure and the ratio of carbon dioxide to hydrogen sulfide in the stripping tower is at least about 10 to 1.

5. A process as in claim 2 further comprising the step of withdrawing the vapor from the stripping tower by a steam ejector through which geothermal steam is passed to operate the ejector.

* * * * *